United States Patent
Susutoglu

[19]

[11] Patent Number: 6,041,839
[45] Date of Patent: Mar. 28, 2000

[54] METALLIC 4+3 CORD FOR THE REINFORCEMENT OF ELASTOMERS

[75] Inventor: Murat Yasar Ahmet Susutoglu, Bissen, Luxembourg

[73] Assignee: The Goodyear Tire & Rubber Company, Akron, Ohio

[21] Appl. No.: 09/008,851

[22] Filed: Jan. 19, 1998

[51] Int. Cl.[7] ............................. B60C 9/00; B60C 9/18; B60C 9/20; D07B 1/08; D07B 1/10

[52] U.S. Cl. .............................. 152/527; 57/212; 57/902; 152/451; 152/526; 152/534; 152/536

[58] Field of Search ........................... 57/902, 212, 223; 152/451, 527, 556, 526, 536, 534

[56] References Cited

U.S. PATENT DOCUMENTS

| | | | |
|---|---|---|---|
| 4,347,290 | 8/1982 | Haemers | 152/451 X |
| 4,586,324 | 5/1986 | Mizuma | 57/212 |
| 4,690,191 | 9/1987 | Kawasaki | 57/902 X |
| 4,986,327 | 1/1991 | Takahira | 152/556 |
| 5,551,498 | 9/1996 | Komatsuki | . |
| 5,616,197 | 4/1997 | Helfer et al. | . |

FOREIGN PATENT DOCUMENTS 0733496  9/1996  European Pat. Off. .

*Primary Examiner*—Adrienne C. Johnstone
*Attorney, Agent, or Firm*—Bruce J. Hendricks

[57] ABSTRACT

A metallic cord for the reinforcement of elastomers has a 4+3 construction wherein the diameter of each filament ranges from 0.35 to 0.50 mm. The lay length of the four filaments in the core may be infinity. A pneumatic tire has a belt structure of at least two radially overlapped layers of elastomeric materials reinforced with metallic cords, each metallic cord of at least one of the layers being the 4+3 metallic cord.

21 Claims, 2 Drawing Sheets

METALLIC 4+3 CORD FOR THE REINFORCEMENT OF ELASTOMERS

BACKGROUND OF THE INVENTION

While the invention is subject to a wide range of applications, it particularly relates to metal cord, such as that used to reinforce elastomers. More particularly, the present invention is directed to a metallic cord construction used to reinforce rubber articles, including pneumatic tires.

In a conventional pneumatic radial tire using metal cords, the fatigue properties of the carcass ply and belt layer are degraded, mainly by material fatigue due to repeated strain and fretting wear in the contact portion between adjacent filaments. Both of these problems are said to be alleviated by penetration of rubber into the inside of the cord. The rubber layer interposed between the steel filaments is believed to prevent rubbing between adjacent filaments, the so-called "fretting wear."

The present invention relates to a cord having improved rubber penetration into the inside of the cord. The improved rubber penetration will also provide the cord with higher corrosion resistance should the cord be exposed to moisture.

The present invention also relates to a tire having improved resistance to belt edge separation resulting from use of the 4+3 cord in the belt layers of the tire.

SUMMARY OF THE INVENTION

The present invention relates to metallic cord for the reinforcement of elastomers having a 4+3 construction wherein the diameter of each filament ranges from 0.35 to 0.50 mm.

DEFINITIONS

As used herein and in the claims, the terms

"axial" and "axially" refer to directions which are parallel to the axis of rotation of a tire, "radial" and "radially" refer to directions that are perpendicular to the axis of rotation of a tire, "bead" refers to that part of a tire comprising an annular tensile member wrapped by ply cords and shaped, with or without other reinforcement elements to fit a designed tire rim, "carcass" refers to the tire structure apart from the belt structure, tread, undertread, and sidewall rubber but including the beads, (carcass plies are wrapped around the beads), "equatorial plane (EP)" refers to a plane that is perpendicular to the axis of rotation of a tire and passes through the center of the tire's tread, "belt" or "belt ply" refers to an annular layer or ply of parallel cords, woven or unwoven, underlying the tread, not anchored to the bead, and having cord angles of from 15° to 66° with respect to the EP of the tire, "crown" refers to substantially the outer circumference of a tire where the tread is disposed, "rivet" refers to the perpendicular distance between two adjacent cords, "tenacity" refers to breaking stress expressed as force per unit linear density of an unstrained specimen (cN/Tex or gm/denier), usually used in textiles, "modulus" refers to the ratio of the change in stress to the change in strain, and "organic" refers to polymeric compounds containing a carbon backbone or structure, which can be shaped, stretched of formed into a particular physical configuration.

DETAILED DESCRIPTION OF THE PREFERRED EMBODIMENT

There is disclosed a metallic cord for the reinforcement of elastomers, said metallic cord having seven filaments consisting of (a) a core composed of four filaments; and (b) a sheath of three filaments wherein the diameter of each filament in the cord ranges from 0.35 mm to 0.50 mm.

In addition, there is disclosed a pneumatic tire with a tread, a carcass having radial cords, two sidewalls spaced apart a distance, which in the axial direction determines the width of the tire section, two beads around each one of which are turned up, from the inside toward the outside, the ends of the cords of the carcass and a belt structure that is circumferentially interposed between the tread and the carcass, the belt structure having a width that is substantially equal to that of the tread and having at least two radially overlapped layers of elastomeric material reinforced with metallic cords, the metallic cords being parallel to each other and included at an angle of between 15° and 66° with respect to the equatorial plane of the tire comprising the belt structure having at least one layer being reinforced with a metallic cord consisting of (a) a core composed of four filaments; and (b) a sheath of three filaments wherein the diameter of each filament in the cord ranges from 0.35 mm to 50 mm.

The present invention will be explained in more detail referring to the accompanying drawings.

Figure 1:
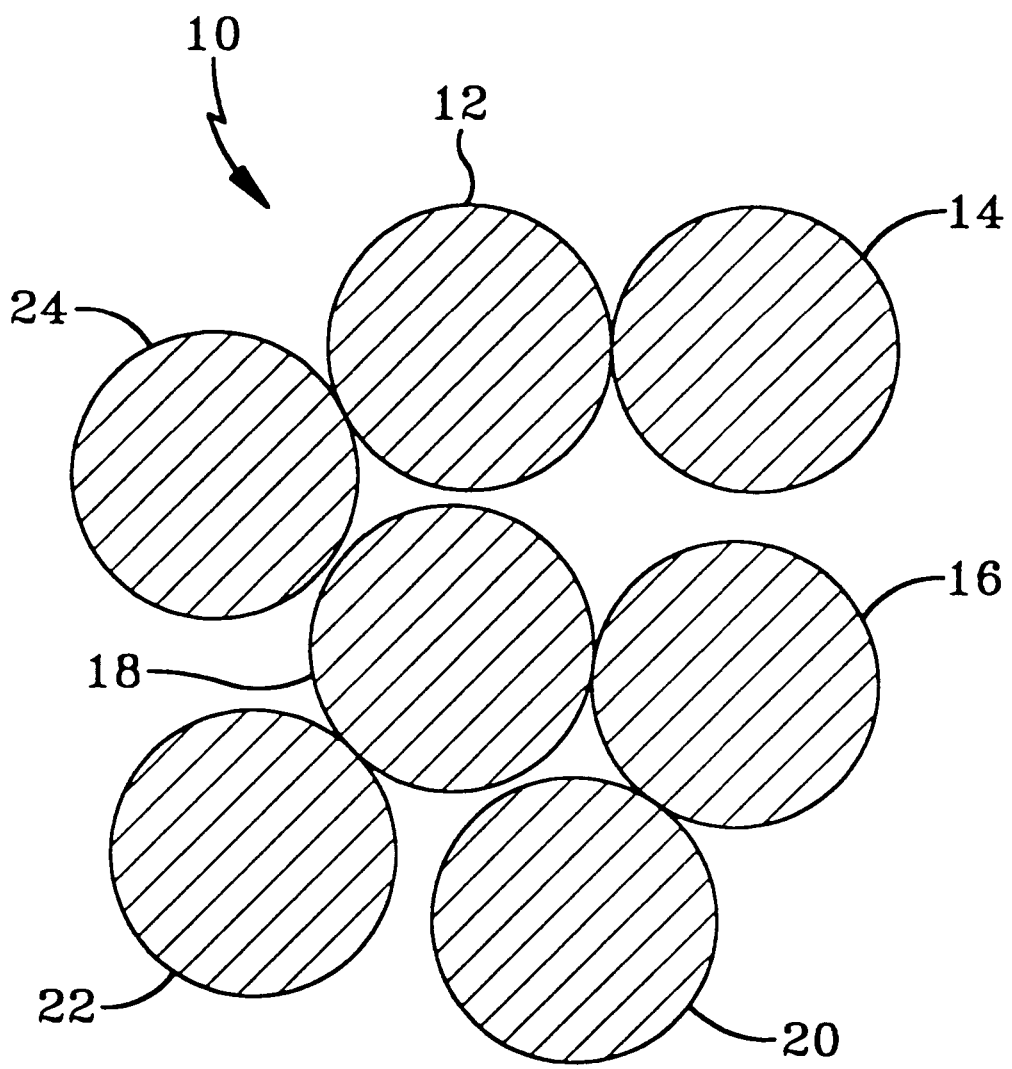
FIG. 1 is a cross-sectional view of a steel cord having a construction of the present invention and FIG. 2 is a cross-sectional view of a tire according to one embodiment of the invention taken in a plane that contains the axis of rotation of the tire.

In FIG. 1, there is illustrated a metallic cord 10 for reinforcing elastomers comprising (a) a core composed of four filaments 12, 14, 16, 18 and (b) a sheath of three filaments 20, 22, 24.

The term "lay length" as used herein with respect to the filaments 12, 14, 16, 18 in the core is the distance along the length of the cord in which the one of the filaments in the core makes a complete (360°) revolution around the outside of the core of four filaments 12, 14, 16, 18. The lay length of core filaments may range from 5 mm to infinity (twistless). Preferably, the lay length of the filaments in the core range is infinity and, therefore, the group of four core filaments 12, 14, 16, 18 are not twisted with respect to the cord 10 axis and with respect to each other.

The term lay length as used herein with respect to the group of three filaments 20, 22, 24 in the sheath is the distance along the outside of the cord 10 in which one of the filament in the sheath makes a complete (360°) revolution around the outside of the cord 10. The group of three filaments 20, 22, 24 are twisted with respect to the cord 10 axis, but they are parallel to each other. The lay length of the three filaments 20, 22, 24 in the sheath may range from 5 mm to 50 mm. Preferably, the lay length ranges from about 15 mm to 25 mm.

The diameter of each filament in the cord 10 may range from about 0.35 mm to 0.50 mm. Preferably, the diameter of the filament ranges from 0.38 mm to 0.44 mm.

The tensile strength of each filament in terms of megapascals should be at least 3040−(1200×D) MPa where D is the diameter of the filament in mm. Preferably, the tensile strength of each filament ranges from about 3040−(1200×D) MPa to 4400−(2000×D) MPa.

The intended use of the cord of the present invention is in a rubber-reinforced article. Such articles will incorporate the cord of the present invention and which will be impregnated with rubber as known to those skilled in the art. Representative of articles may use the cord of the present invention include belts, tires and hoses. In the most preferred application, the cord of the present invention is used in a belt ply of a pneumatic tire.

Figure 2:
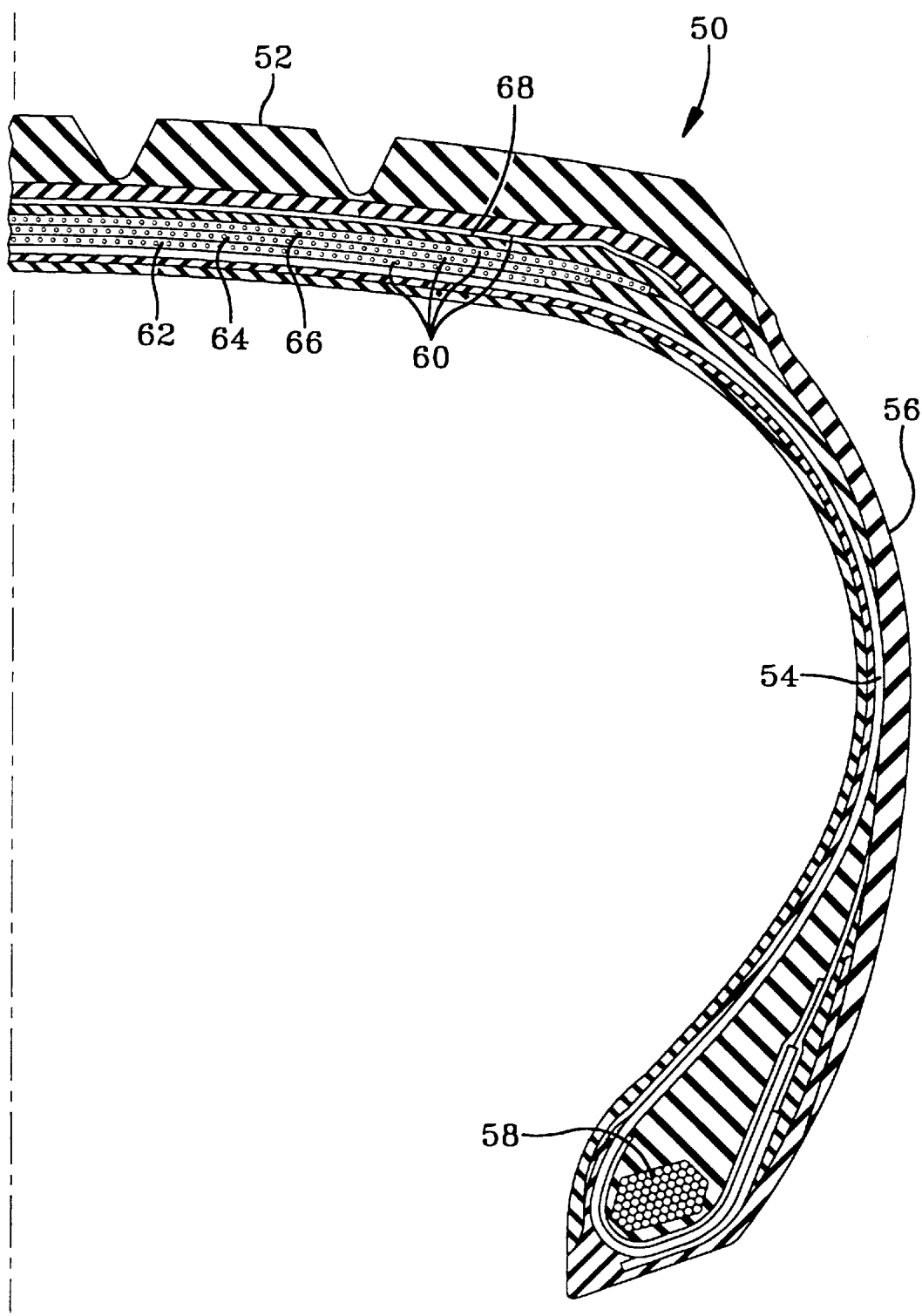

With reference to FIG. 2, one embodiment of a pneumatic tire 50 of the present invention is illustrated which comprises a tread 52, carcass plies 54 having radial cords, two sidewalls 56 spaced apart a distance which in the axial direction determines the width of the tire section, two beads 58 around each are turned up, from the inside toward the outside, the ends of the cords of the carcass plies 54 and a belt structure 60 that is circumferentially and relatively inextensible interposed between the tread 52 and the carcass plies 54. The belt structure 60 has a width that is substantially equal to that of the tread 52 and has at least two radially overlapped layers of elastomeric material 62, 64, 66 reinforced with metallic cords of the present invention. The belt structure has from 2 to 12 layers, with three to four layers being preferred.

According to one embodiment, the 4+3 cord is used in two belt plies 64, 66 or three belt plies 62, 64, 66 and the top belt 68 is reinforced with filaments or cords of an organic polymer. Any organic polymer having sufficient strength and durability for the purpose described can be used. Examples of such organic polymers are thermoplastics such as nylon 46, nylon 66, nylon 6, nylon 12; polyesters such as polyethyleneterephthlate, polyethylenenapthalate; and polyvinyl alcohol. Preferably, nylon monofilaments are used. In accordance with one embodiment, monofilaments having a round cross-section are used and have at least 2,200 decitex, with a tenacity of at least 31 cN/tex, an initial modulus of at least 177 cN/tex, an elongation at break of at least 15 percent and a shrinkage of at most 6 percent. Preferably, the monofilament for use in the top belt 68 has a decitex of from 2,200 decitex to 10,000 decitex. Monofilaments of nylon, particularly well suited for use in the top belt 68 are those sold by Shakespeare of Columbia, S.C., under the designation WN 125.

The top belt 68 is generally constructed so as to have a monofilament end count ranging from 8 to 25 ends per inch (EPI) or 3.15 to 9.84 ends per cm. Preferably, the end count ranges from 12 to 15 ends per inch or 4.72 to 5.91 ends per cm.

The filament or cords of the top belt 68 may lie in the same or at opposite direction to those cords in the next underlying belt ply 66.

The belt plies 62, 64, 66 containing the 4+3 cord are so constructed so as to have a cord end count ranging from 8 to 15 ends per inch (EPI) or 3.15 to 5.91 ends per cm. Preferably, the end count ranges from 9 to 12 ends per inch or 3.54 to 4.72 ends per cm.

The pneumatic tires 50 of the present invention may be designed for various load ranges. For example, the load ranges may be E, F, G, H, J or L. Preferably, the load ranges are H and J.

EXAMPLE

Three groups of 315/80R22.5 (Goodyear G391 Unisteel construction) tires (Load range H) were tested for durability. Two tires were tested from each group. The tire of the first group (present invention) had three steel-reinforced belt plies of which two were reinforced with 4+3×0.41 cord at an end count of 10 ends per inch and the bottom belt was reinforced with 3×0.22/9×0.20+1 at an end count of 12 ends per inch. A round nylon monofilament (10,000 decitex) reinforced the top belt ply at an end count of 15 ends per inch. The second group, control 1, tire was identical to the tire of the first group (present invention) except the two out of the three belt plies in the belt structures were reinforced with 3×30.65/9×0.34+1 cord at an end count of 9 ends per inch. The tire of the third group, control 2, had three steel belt plies of which two were reinforced with 3×0.265/9× 0.245 steel cord at an end count of 16 ends per inch, the bottom belt was reinforced with 3×0.22/9×0.20+1×0.15 at an end count of 12 ends per inch and the top belt ply was reinforced with 3×0.265/9×0.245 steel cord at an end count of 12 ends per inch. All belt angles were the same and the remaining design feature of all tires were the same.

The table below provides the test data for the average of the two tires from each group from two endurance tests. The first test is the 120-inch Smooth wheel test wherein the speed of the wheel is constant with increased loads over time. The results of the first test are reported in terms of kilometers to failure and standardized to the control two tire results. The second test is known throughout the industry as ECE-R54. The results from ECE-R54 are reported in terms of hours to failure and standardized to the control 2 tire results.

|  | Control 2<br>3 × .265/<br>9 × .245 | Control 1<br>3 × .365/9 × .34 + 1<br>Nylon monofil | Present Invention<br>4 + 3 × .41<br>Nylon monofil |
| --- | --- | --- | --- |
| Km to failure Rating | 100 | 167 | 165 |
| Hrs to failure Rating | 100 | 120 | 137 |

What is claimed is:

1. A metallic cord for the reinforcement of elastomers, said metallic cord having a 4+3 construction consisting of
   (a) a core of four filaments wherein the lay length of the four filaments in the core is infinity;
   (b) a sheath of three filaments, wherein the diameter of each filament in the cord ranges from 0.35 mm to 0.50 mm.

2. The metallic cord of claim 1 wherein the lay length of the three filaments in the sheath ranges from 5 mm to 50 mm.

3. The metallic cord of claim 1 wherein the diameter of each filament ranges from 0.38 to 0.44 mm.

4. The cord of claim 1 wherein the tensile strength of each filament is at least 3040−(1200×D) MPa where D is the diameter in millimeters of the filament.

5. The cord of claim 4 wherein the tensile strength of each filament ranges from 3040−(1200×D) MPa to 4400−(2000× D) MPa.

6. The cord of claim 1 wherein said cord is impregnated with rubber.

7. A pneumatic tire with a tread, carcass plies having radial cords, two sidewalls spaced apart a distance, which in the axial direction determines the width of the tire section, two beads around each one of which are turned up, from the inside toward the outside, the ends of the cords of the carcass plies and a belt structure that is circumferentially interposed between the tread and the carcass plies, the belt structure having a width that is substantially equal to that of the tread and having at least two radially overlapped layers of elastomeric material reinforced with metallic cords, the metallic cords being parallel to each other and included at an angle of between 15° and 66° with respect to the equatorial plane of the tire, each metallic cord of at least one layer having a 4+3 construction consisting of (a) a core of four filaments wherein the lay length of the four filaments in the core is infinity; and (b) a sheath of three filaments, wherein the diameter of each filament in the cord ranges from 0.35 to 50 mm.

8. The tire of claim 7 wherein the lay length of the three filaments in the sheath ranges from 5 mm to 50 mm.

9. The tire of claim 7 wherein the diameter of each filament ranges from 0.38 mm to 0.44 mm.

10. The tire of claim 7 wherein the tensile strength of each filament is at least 3040–(1200×D) MPa where D is the diameter in millimeters of the filament.

11. The tire of claim 10 wherein the tensile strength of each filament ranges from 3040–(1200×D) MPa to 4400–(2000×D) MPa.

12. The tire of claim 7 wherein said at least two radially overlapped layers of elastomeric material reinforced with metallic cords in the belt structure are 2 to 12 of said layers.

13. The tire of claim 7 wherein said at least two radially overlapped layers of elastomeric material reinforced with metallic cords in the belt structure are four of said layers.

14. The tire of claim 7 wherein the cord end count of each said layer reinforced with said metallic cords ranges from 8 to 15 ends per inch (3.15 to 5.91 ends per cm).

15. The tire of claim 7 wherein the tire has a load range selected from the group consisting of E, F, G, H, J and L.

16. The tire of claim 7 wherein the top layer of said belt structure is a layer of elastomeric material reinforced with organic polymer filaments or cords parallel to each other and included at an angle of between 15° and 66° with respect to the equatorial plane of the tire.

17. The tire of claim 16 wherein said organic polymer is selected from the group consisting of nylon, polyester and polyvinyl alcohol.

18. The tire of claim 16 wherein said organic polymer filaments or cords are nylon monofilaments.

19. The tire of claim 18 wherein each said nylon monofilaments are round.

20. The tire of claim 6 wherein the filaments or cords of the top layer of said belt structure lie in the same direction as the metallic cords in the next underlying belt layer with respect to the equatorial plane of the tire.

21. The tire of claim 16 wherein the filaments or cords of the top layer of said belt structure lie in the opposite direction to the metallic cords in the next underlying belt layer with respect to the equatorial plane of the tire.

* * * * *